United States Patent [19]

Takahashi

[11] 4,135,205
[45] Jan. 16, 1979

[54] SKIP FIELD RECORDER WITH AUDIO MULTIPLEXER

[75] Inventor: Hiroo Takahashi, Fujisawa, Japan

[73] Assignee: Sony Corporation, Tokyo, Japan

[21] Appl. No.: 694,818

[22] Filed: Jun. 10, 1976

[30] Foreign Application Priority Data

Jun. 19, 1975 [JP] Japan .................................. 50-74657

[51] Int. Cl.² .............................................. H04N 5/76
[52] U.S. Cl. ..................................... 358/127; 360/11; 360/19; 358/143
[58] Field of Search ..................... 360/19, 11, 8, 9, 24, 360/33, 18; 358/143, 145, 127, 128; 179/100.3 V, 15 A

[56] References Cited

U.S. PATENT DOCUMENTS

| | | | |
|---|---|---|---|
| 3,263,027 | 7/1966 | Beltrami | 358/143 |
| 3,748,381 | 7/1973 | Strobele | 360/19 |
| 3,908,076 | 9/1975 | Broadbent | 360/19 |
| 3,991,265 | 11/1976 | Fukuda | 360/19 |

Primary Examiner—Bernard Konick
Assistant Examiner—Alan Faber

Attorney, Agent, or Firm—Lewis H. Eslinger; Alvin Sinderbrand

[57] ABSTRACT

In the recording section of a system for recording and reproducing a television signal containing a video signal component and a sound signal component the length of recording time is increased for a given amount of recording medium by periodically sampling the video signal component, for example, for alternate frame periods, and the sound signal component and a delayed sound signal component obtained by means of an one-frame delay device are alternately sampled for the first half and the second half of each line period during the sampled frame period in order to be recorded on a recording medium and be reproduced from the recording medium. In the reproducing section, each recorded frame of the video signal component is reproduced twice in succession along with the sound signal component, and the reproduced sound signal component is sampled for the first half of each line period during the first reproduction of the recorded frame and for the second half of each line period during the second reproduction of the same frame.

2 Claims, 9 Drawing Figures

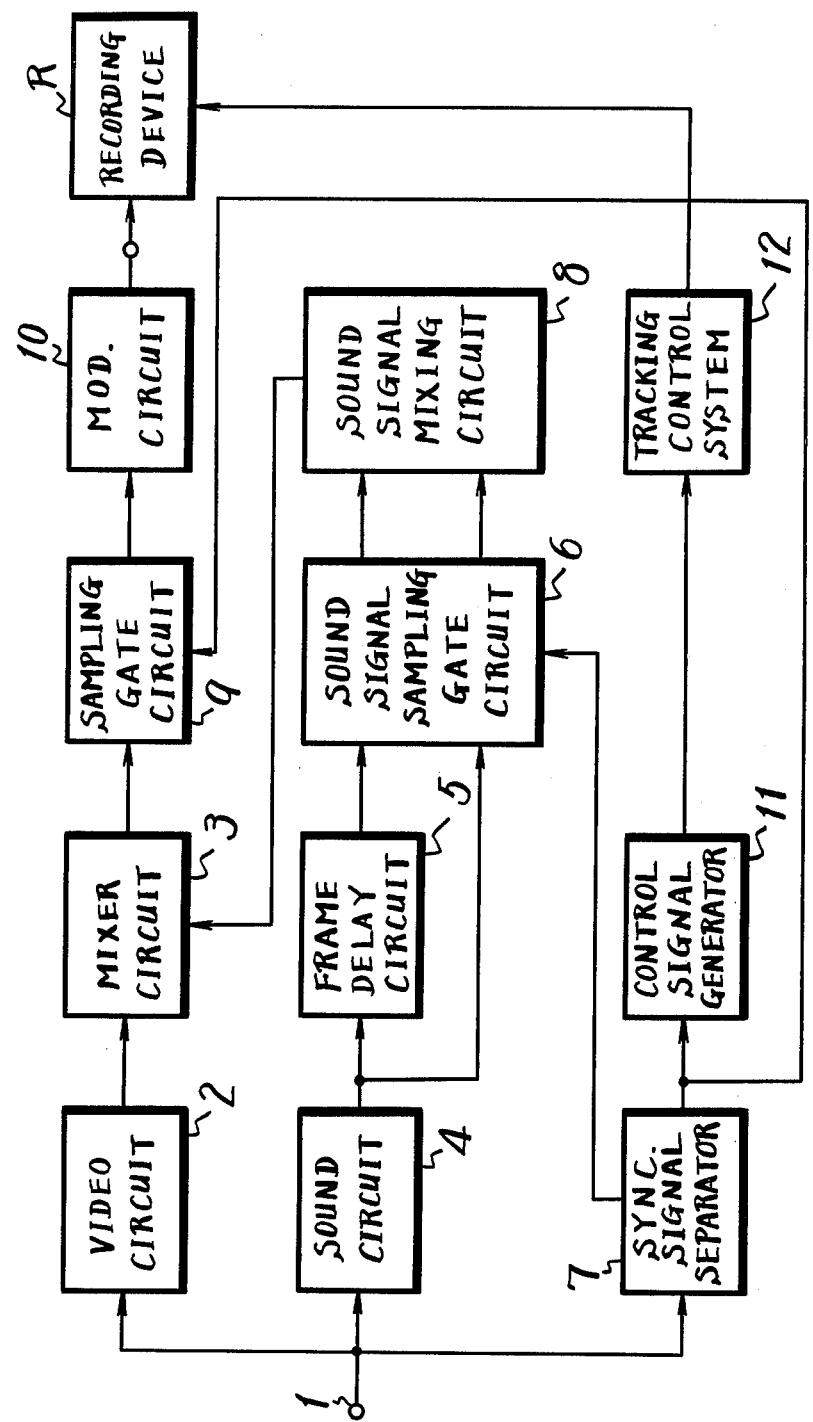

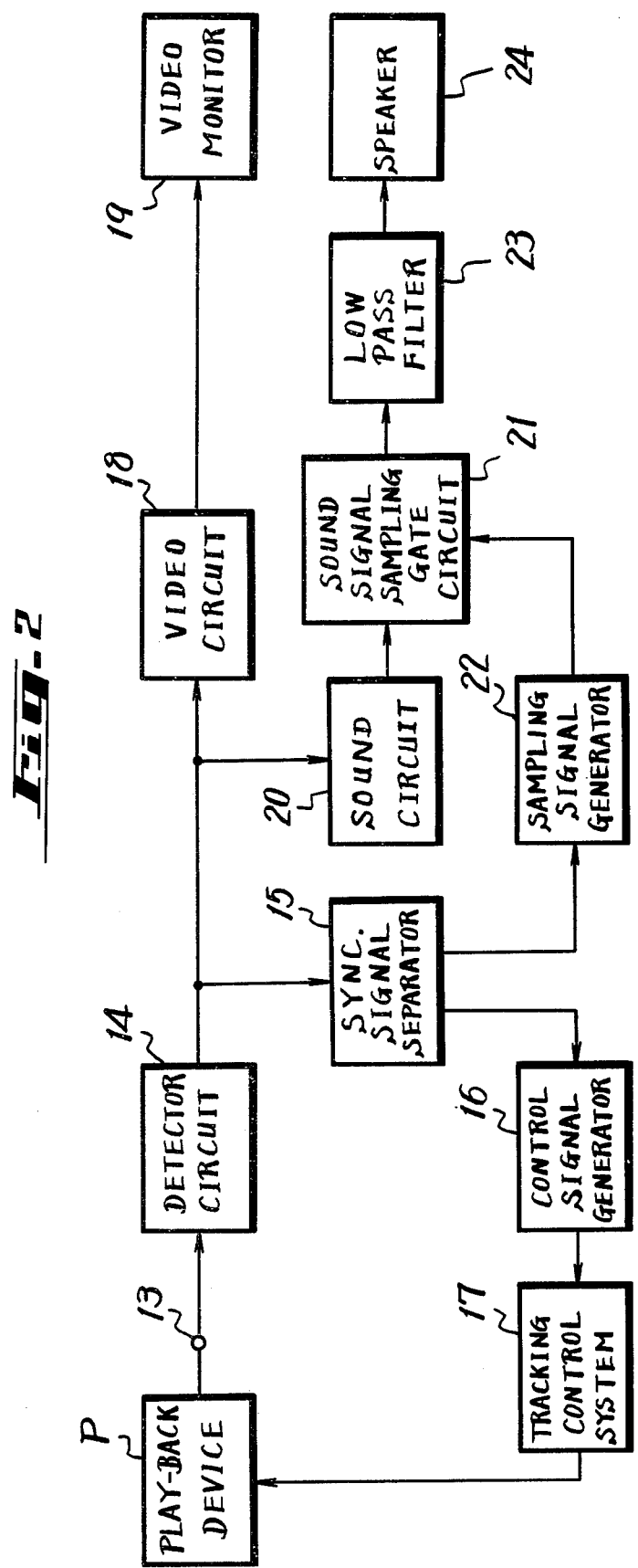

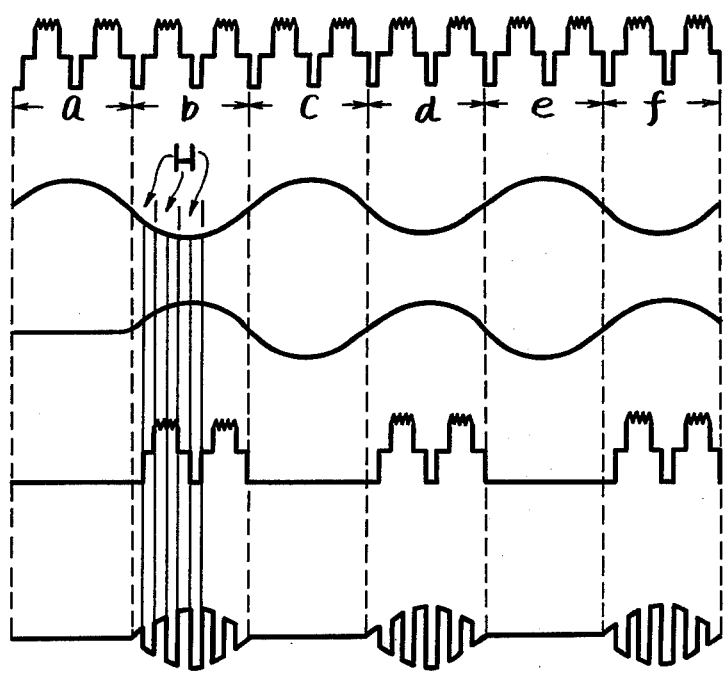
Fig. 3A
Fig. 3B
Fig. 3C
Fig. 3D
Fig. 3E
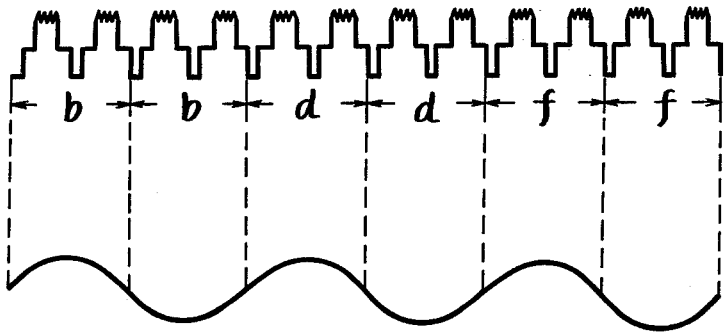
Fig. 4A
Fig. 4B

SKIP FIELD RECORDER WITH AUDIO MULTIPLEXER

BACKGROUND OF THE INVENTION

1. Field of the Invention

This invention relates generally to a system for recording and reproducing a composite television signal containing a video signal component and a sound signal component, and more particularly to a system for achieving long-time recording of the television signal for the purpose of long-playback from a given amount of recording medium.

2. Description of the Prior Art

Various systems have been proposed for recording a television signal on a recording medium such as a magnetic tape, rotatable magnetic sheet, rotatable optical disc and the like, and reproducing the recorded television signal in the composite form or in the form of separated video signal, sound signal and other signals. To cite an example of the system utilizing the rotatable optical disc, generally the rotating speed of the disc is such that each frame interval of the television signal is optically recorded on the rotating disc at each turn of the latter and, as a result, a plurality of one-frame circular tracks are formed on the disc with a predetermined space between adjacent tracks. Actually, each of these tracks spirals into the next one to form a single recorded spiral track inclusively. In reproducing, the recorded disc is turned at the same speed as in recording and each recorded frame interval of the television signal is reproduced at each turn of the disc sequentially from the recorded spiral track.

In such a previously proposed system, a certain annular area on the surface of the rotatable disc is used at every turn of the disc in forming a single circular track, on which one frame interval of the television signal is recorded, together with the space provided for separating the track from adjacent circular tracks. Accordingly, the total recording time is restricted by the dimensions of that portion of the surface of the disc available for forming the recording track. Generally, it is difficult to allow the diameter of the rotatable disc to be immoderately large and it is restricted to be, for example, 10 to 15 inches. As a result of this, the total recording time is limited to a short duration of, for example, 30 minutes for a disc of 12 inch diameter.

To increase the recording time, some attempts have been proposed in prior art recording and reproducing systems. According to one of those attempts, the rotational speed of the disc is reduced enough to record several frame intervals of the television signal on a single circular track. According to another attempt, the space between each pair of adjacent circular tracks, that is, the pitch of the spiral track is reduced so as to increase the track density on the surface of the disc. These attempts, however, require the recording mechanism to have extremely accurate operation with very complicated and sensitive controls. Such mechanisms can only be produced with many difficulties. In addition, they are likely to cause deteriorations in the quality of reproduced signals. Therefore, satisfactory lengthening of the recording time has not been accomplished by the previously proposed attempts.

SUMMARY OF THE INVENTION

It is an object of the present invention to provide an improved system for recording and reproducing a television signal which can increase the length of recording and reproducing time for a given amount of recording medium without the above-mentioned disadvantages of the prior art systems.

Another object of the present invention is to provide an improved recording system for recording a television signal on a recording medium with reduced consumption of the recording area of the recording medium so as to increase the total recording time.

A further object of the invention is to provide an improved reproducing system for reproducing a television signal recorded on a recording medium with reduced consumption thereof for the purpose of obtaining longer playback time.

According to one example of the system of the present invention, a composite television signal is separated into its video and sound signal components, and the sound signal component is passed through a delay circuit in which it is delayed by one frame period of the video signal component. The delayed sound signal component is sampled at the first (or second) half of every line period of the video signal and the original (undelayed) sound signal component is sampled at the second (or first) half of every line period, and both sampled sound signal components are mixed together. The mixed sound signal component is mixed with the video signal component. The mixed video and sound signal components are sampled, for example, during every other frame period and the resultant sampled signal is recorded on a recording medium to form a circular recorded track during each sampled frame period. In consequence, the recording is done only during alternate frame periods. Therefore, the consumption of the recording area of the recording medium is reduced. This results in the increasing the recording time. During playback, the recorded signal on ech circular recorded track, which contains the video signal component of one frame and the mixed sound signal component, is reproduced twice in succession. The reproduced mixed sound signal component is sampled for the first (or second) half of every line period during the first reproduced frame of the video signal component and is also sampled for the second (or first) half of every line period during the second reproduced frame, which is repeatedly reproduced, of the video signal component. Accordingly, the continuous reproduced video signal component, which is made up of pairs of identical frames, and the reproduced sound signal component corresponding to each frame of the reproduced video signal component are obtained. Since the difference between every pair of successive frames of the original video signal component is negligible, the reproduced video signal component which consists of every other original frame and its replica provided in succession is substantially the same as the original video signal component and does not have any substantial deterioration. Further, although the reproduced sound signal component is sampled during every half line period, this does not result in any substantial deterioration in the reproduced sound because the sampling frequency is sufficiently high.

Other objects, features and advantages of the present invention will be apparent from the following description taken in conjunction with the accompanying drawings.

BRIEF DESCRIPTION OF THE DRAWINGS

FIG. 1 is a schematic block diagram showing an example of a television signal recording system according to the present invention.

FIG. 2 is a schematic block diagram showing an example of a television signal reproducing system according to the present invention.

FIGS. 3A to 3E are schematic waveforms used for explanation of the recording system shown in FIG. 1.

FIGS. 4A and 4B are schematic waveforms used for explanation of the reproducing system shown in FIG. 2.

DESCRIPTION OF THE PREFERRED EMBODIMENT

In the recording system for a television signal according to the present invention as shown in FIG. 1, a composite television signal consisting of a video signal and a sound signal is applied to an input terminal 1. This is the input terminal of a video signal circuit 2 which produces at its output terminal the video signal component of the television signal as shown in FIG. 3A. The output terminal of the video circuit 2 is connected to the input terminal of a mixer circuit 3 to supply the video signal component to the latter. The input terminal 1 also serves as the input terminal of a sound signal circuit 4 which produces at its output terminal the sound signal component contained in the television signal as shown in FIG. 3B. The output terminal of the sound circuit 4 is connected directly to one of the input terminals of a sound signal sampling gate circuit 6 and to the other input terminal thereof through a delay circuit 5 which delays a signal supplied thereto by, for example, 1/30 of a second, or one frame period, of the video signal. Thus, the gate circuit 6 is supplied at the same time with the sound signal shown in FIG. 3B and the sound signal delayed by, for example, one frame period of the video signal shown in FIG. 3C.

The input terminal 1 also serves as the input terminal of a synchronizing signal separating circuit 7 which produces, at one of its output terminals, a horizontal synchronizing signal and at its other output terminal a vertical synchronizing signal. The first-mentioned output terminal of the synchronizing signal separating circuit 7 is connected to a horizontal synchronizing signal input terminal of the sound signal sampling gate circuit 6 to supply the horizontal synchronizing signal to the latter. Thus, the gate circuit 6 is controlled by the horizontal synchronizing signal and operated to sample, or gate, both the undelayed sound signal and the sound signal that is delayed by, for example, one frame period of the video signal as shown in FIG. 3C. The delayed sound signals is sampled during the first half period of each horizontal period (line period) H, and the sound signal which is undelayed as shown in FIG. 3B is sampled during the latter half period of each line period H, only three line periods H being indicated specifically in frame b, the line periods thus obviously being shown as considerably exaggerated in time for clarity. For this reason, both the sound signals shown in FIGS. 3B and 3C are alternately and sequentially sampled by the sound signal sampling gate circuit 6 at every half line period.

The output terminals of the gate circuit 6 are connected through a sound signal mixing or multiplexing circuit 8 to a sound signal input terminal of the mixer circuit 3. That is, two sampled signals obtained at the output terminals of the gate circuit 6 are mixed in the mixing circuit 8 and the resulting mixed signal is applied to the mixer circuit 3. As described previously, the mixer circuit 3 is also supplied also with the video signal, so that it mixes the sampled sound signal with the video signal. The output terminal of the mixer circuit 3 is connected to one input terminal of a sampling gate circuit 9. This gate circuit also has a vertical synchronizing signal supplying terminal, to which the output terminal of the synchronizing signal separating circuit 7 is connected to be supplied with the vertical synchronizing signal from the separator circuit 7. In this case, the gate circuit 9 is controlled with the vertical synchronizing signal and operated to sample the mixed resultant of the video signal and sampled sound signal from the mixer circuit 3 at, for example, every other one frame period of the video signal. In other words, the sampling gate circuit 9 operates to cut off the mixed signal from the mixer circuit 3 during, for example, the first one frame period of the video signal, to pass therethrough the mixed signal during the following one frame period, to cut off the same during the following one frame period, and to pass therethrough the following one frame period, and to continue to repeat these steps. As a result, the gate circuit 9 can produce at its output terminal a mixed signal of a sampled video signal shown in FIG. 3D, which contains only b-, d- and f-frame components of the video signal shown in FIG. 3A, and a sampled sound signal shown in FIG. 3E. In this case, the sampled sound signal shown in FIG. 3E contains a sound signal component delayed by, for example, one frame period of the video signal as described above, so that the sampled sound signal mixed with, for example, the b-frame component of the video signal contains the sound signal component corresponding to the b-frame component of the video signal and the sound signal component ahead of the immediately preceding frame period, that is, the a-frame component of the video signal.

The output terminal of the sampling gate circuit 9 is connected to the input terminal of a modulating circuit 10 to supply the mixed signal passed through the gate circuit 9 to the latter. The modulating circuit 10 modulates a carrier applied thereto with the mixed signal, and the resulting modulated signal is supplied to a recording device R to be recorded on a recording medium such as a rotatable disc (not shown). This recording is carried out by modulating a light beam or electron beam with the signal from the modulating circuit 10 and using the modulated light or electron beam to modify the surface of the disc optically or electronically.

The output terminal of the synchronizing signal separating circuit 7 from which vertical synchronizing signals are obtained is connected through a control signal generating network 11 to the input terminal of a tracking control system 12 that supplies an output signal to the recording device R to control a recording beam, for example, a light beam (or electron beam) scanning the surface of the rotatable disc in the recording device R so as to record output signal of the circuit 10 by means of an optical record (or electronic record). That is, the vertical synchronizing signal is applied to the control signal generating network 11 and the control signal generated therefrom is applied to the tracking control system 12 to control the latter.

In the recording device R, the relative relation between the rotatable disc and, for example, the light beam scanning the surface thereof is selected so that, at every time the rotatable disc makes one complete turn, thereby causing the light beam to scan a complete circle on the surface of the rotatable disc, a signal of one frame period is recorded on the rotatable disc as a circular record track. The light beam is controlled by the control system 12 to form a recorded track at every alternate rotation of the rotatable disc, and during the recordings the light beam is moved in the radial direction of the disc by a predetermined pitch. It is preferred that when the light beam is moved in the radial direction, the light beam is prevented from recording. The light beam is modulated during alternate frame periods in accordance with the successive operation of the sampling gate circuit 9. The gate circuit 9 cuts off the mixed signal from the mixer circuit 3 during, for example, odd frame periods of the video signal, then passes the mixed signal therethrough during even frame periods as described previously to form a succession of circular recorded tracks on the rotatable disc. That is, the light beam is moved radially by the predetermined pitch without forming any recorded track during the time periods when the mixed signal from the mixer circuit 3 is cut off by the gate curcuit 9, but is modulated by the signal from the modulating circuit 10 and is stopped to scan the rotatable disc in accordance with the rotation thereof to form a circular recorded track thereon of the signal from the modulating circuit 10 at the rate of one frame per turn during the time period when the next mixed signal is transmitted through the gate circuit 9.

With the recording system of the present invention constructed as above, when the television signal containing the video signal shown in FIG. 3A and the sound signal shown in FIG. 3B are supplied to the input terminal 1, the sampled video signal shown in FIG. 3D and the sampled sound signal shown in FIG. 3E can be recorded on the rotatable disc in superimposed state. In this case, the sampled signals are recorded during alternate turns of the rotatable disc corresponding to alternate frame periods of the video signal, so that only half as much of the rotatable disc is used as compared with the case in which a complete television signal is recorded without being sampled, and hence a recording capable of playing twice the normal time can be produced.

An example of the reproducing system according to the present invention for the signal recorded as described above will be described with reference to FIG. 2 and FIGS. 4A and 4B.

In FIG. 2, a play-back device P includes means by which the carrier signal that was modulated by the mixed signal consisting of the sampled video signal and the sampled sound signal is reproduced. The reproducing means may be, for example, a light beam (not shown). The reproduced signal is supplied to an input terminal 13 of a detector, or demodulator, circuit 14 which produces at its output terminal a demodulated output signal. The latter consists of the mixed signal, which includes both the sampled video signal and sampled sound signal. The output terminal of the demodulator circuit 14 is connected to the input terminal of a synchronizing signal separating circuit 15 which separates out the vertical synchronizing signal and the horizontal synchronizing signal. The vertical synchronizing signal from the separator circuit 15 is connected to a control signal generating circuit 16 which is connected, in turn, to a tracking control system 17 capable of controlling the light beam scanning the recorded rotatable disc for optical playback. That is, the vertical synchronizing signal is fed to the control signal generator circuit 16, and the control signal generated therefrom is fed to the tracking control system 17 to control the same. In the playback device P the light beam scans the same circular recorded track on the disc twice while the disc is rotating at a predetermined speed. This type of scanning is carried out for each circular recorded track. In this case, the signal recorded on the respective tracks of the disc is reproduced at the rate of one frame per turn of the disc. Thus, the modulated signal corresponding to the b-frame component of the video signal shown in FIG. 3A is reproduced twice. Similarly, the modulated signals corresponding to the d- and f- frame frame components of the video signal are reproduced twice, respectively. As a result, the input terminal 13 is supplied with the modulated signal corresponding to the b-frame component of the video signal twice and then with the modulated signal corresponding to the d-frame component of the video signal twice. Thus, at the output terminal of the demodulator circuit 14 there are respectively obtained, twice, a mixed signal of the b-frame component of the video signal and the sampled sound signal corresponding thereto, a mixed signal of the d-frame component of the video signal and the sampled sound signal corresponding thereto, and so on, which are repeated twice and sequentially.

The output terminal of the demodulator circuit 14 is also connected through a video signal reproducing circuit 18 to the input terminal of a video monitor 19 to supply thereto the reproduced video signal component of the mixed signals obtained at the output terminal of the demodulator circuit 14, as shown in FIG. 4A, to cause a reproduced picture to be diplayed. In this case, the reproduced video signals are such that the a-, c- and e-frame components of the original video signal shown in FIG. 3A are replaced by respective one frame components of the video signal of the following frame components, i.e. the b-, d- and f-frame components of the video signal, respectively. In a normal television picture, however, the picture content is not changed so abruptly and hence the difference between two successive frame video signals can be neglected, so that even if one frame component of the video signal is reproduced twice as described above, the reproduced picture does not become unnatural for a viewer.

The output terminal of the demodulator circuit 14 is also connected through a sound signal detecting circuit 20 to the input terminal of a sound signal sampling gate circuit 21 to detect the sampled sound signal in the mixed signal and supply the sampled sound signal to the sound signal sampling gate circuit 21. Further, the horizontal synchronizing signal output terminal of the synchronizing signal separator 15 is connected to a sampling signal generating circuit 22 and the output of the latter is connected to the sampling signal input terminal of the gate circuit 21. Thus, the horizontal synchronizing signal is fed to the sampling signal generator 22 which then produces at its output terminal a sampling signal, and this sampling signal is fed to the gate circuit 21 to control the same. The gate circuit 21 is so controlled that it samples the sound signal at every repeating reproduction of one frame video signal with the sampling being delayed by ½ line period. That is, when the light beam with the sampling being the same recorded track on the disc twice as described above, for example, to reproduce the b-frame component of the video signal twice in succession as shown in FIG. 4A, the gate circuit 21 samples only the sound signal corresponding to the a-frame component of the video signal during the reproduction of the first period of the b-frame components, while during the reproduction of the second period of the b-frame components, the gate circuit 21 samples only the sound signal corresponding to the b-frame component of the video signal, the sampling during the second period of the b-frame components being delayed by a half line period from the sound signal corresponding to the a-frame component of the video signal.

The output terminal of the gate circuit 21 is connected through a low pass filter 23 to the input terminal of a speaker 24, so that the output signal from the gate-circuit 21 is smoothed out by the low pass filter 23 and then fed to the speaker 24. Thus, when the first period of the b-frame components of the video signal is reproduced, the sound signal corresponding to the video signal component one frame period ahead of the b-frame component, i.e., the a-frame component, is reproduced, while when the second period of the b-frame components is reproduced, the sound signal corresponding to the b-frame component, itself, is reproduced. In this way the original sound signal shown in FIG. 3B is reproduced, as shown in FIG. 4B.

In the reproducing system of the invention constructed as above, when the signal, which is formed by modulating the carrier signal with the mixed signal of the video signal and sound signal shown in FIGS. 3D and 3E and recorded on a recording medium such as the rotatable disc for a long period of time, is reproduced by, for example, the light beam, the video monitor 19 is supplied with the video signal shown in FIG. 4A, and the speaker 24 is supplied with the sound signal corresponding to the video signal shown in FIG. 4B, so that the monitor 19 and speaker 24 reproduce a picture and a sound which are substantially the same as those recorded.

As described above, with the systems according to the present invention, long-time recording and reproducing of a television signal can be achieved by improving the signal system and control system of the recording and reproducing systems.

In the above description, the video signal is superimposed with the sound signal, which is obtained by alternately and sequentially sampling at every ½ line period the sound signals corresponding to two frames of the video signal and then combining the sampled sound signals, The resulting mixed signal is sampled at every other frame and then recorded. It is, however, also possible to sample the video signal of one frame at every second frame. A sound signal is obtained by alternately and sequentially sampling the respective sound signals of two frames at every ½ line period during the period of the sampled video signal and combining the same, and the above sampled video and sound signals are superimposed with each other and then recorded.

It will be easily understood from the above example that in place of the above frame the similar sampling can be performed at every field (one frame consists of two fields).

It will be apparent that many modifications and variations could be effected by one skilled in the art without departing from the true scope of the present invention, so that the true scope of the invention should be determined by the following claims.

I claim as my invention:

1. A system for recording a television signal containing a video signal having line periods and a sound signal, said system comprising:

input means extracting said sound signal from said television on signal and delaying said extracted sound signal for a first period substantially longer than each of said line periods for providing delayed and undelayed sound signals separated from said video signal, said input means further comprising synchronizing means detecting said line periods for providing a separate line synchronizing signal;

first sampling means controlled by said line synchronizing signal and being connected to said input means for sampling said delayed and undelayed sound signals alternately during successive second periods which are each equal in duration to one-half the duration of each said line period;

multiplexing means connected to said first sampling means for multiplexing said sampled delayed and undelayed sound signals into a continuous multiplexed sound signal made up of successive one-half line periods of said delayed and undelayed sound signals, alternately;

mixing means connected to said multiplexing means and said input means for mixing said continuous multiplexed sound signal and said video signal into a mixed, multiplexed sound and video signal;

second sampling means connected to said mixing means for sampling said mixed, multiplexed sound and video signal during alternate ones of said first periods; and recording means connected to said second sampling means for recording the signal from the latter.

2. A system for recording a television signal containing a video signal having frame periods which are subdivided into line periods and a sound signal, said system comprising:

input means extracting said sound signal from said television signal and delaying said extracted sound signal for a frame period for providing delayed and undelayed sound signals separated from said video signal, said input means further comprising synchronizing means detecting said line and frame periods for providing corresponding separate line and frame synchronizing signals at respective terminals;

sound signal sampling means controlled by said line synchronizing signal and being connected to said input means for sampling said delayed and undelayed sound signals alternately during first and second halves, respectively, of each of said line periods;

multiplexing means connected to said sound signal sampling means for multiplexing said sampled delayed and undelayed sound signals into a continuous multiplexed sound signal made up of successive one-half line periods of said delayed and undelayed sound signals, alternately;

mixing means connected to said multiplexing means and said input means for mixing said continuous multiplexed sound signal and said video signal into a mixed, multiplexed sound and video signal;

second sampling means controlled by said frame synchronizing signal and being connected to said mixing means for sampling said mixed, multiplexed sound and video signal during alternate ones of said frame periods; and recording means connected to said second sampling means for recording the signal from the latter.

* * * * *